United States Patent
Olsson et al.

(10) Patent No.: US 9,706,452 B2
(45) Date of Patent: Jul. 11, 2017

(54) SGSN-MME CENTRIC HANDOVER

(75) Inventors: Lasse Olsson, Shanghai (CN); Xiao Li, Shanghai (CN); Hanbing Zhang, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 13 days.

(21) Appl. No.: 14/126,188

(22) PCT Filed: Jun. 16, 2011

(86) PCT No.: PCT/EP2011/060020
§ 371 (c)(1),
(2), (4) Date: Dec. 13, 2013

(87) PCT Pub. No.: WO2012/171566
PCT Pub. Date: Dec. 20, 2012

(65) Prior Publication Data
US 2014/0128081 A1    May 8, 2014

(51) Int. Cl.
*H04W 36/00* (2009.01)
*H04W 48/18* (2009.01)
*H04W 36/16* (2009.01)
*H04W 88/14* (2009.01)

(52) U.S. Cl.
CPC ....... *H04W 36/0072* (2013.01); *H04W 48/18* (2013.01); *H04W 36/16* (2013.01); *H04W 88/14* (2013.01)

(58) Field of Classification Search
CPC ... H04W 36/072; H04W 36/16; H04W 48/18; H04W 88/14
USPC .......................... 455/436–445, 453; 370/331
See application file for complete search history.

(56) References Cited

U.S. PATENT DOCUMENTS

| | | | |
|---|---|---|---|
| 2003/0002460 A1* | 1/2003 | English | H04W 36/18 370/331 |
| 2006/0209970 A1* | 9/2006 | Kanterakis | 375/259 |
| 2008/0144493 A1* | 6/2008 | Yeh | 370/230 |
| 2008/0259873 A1* | 10/2008 | Ahmavaara et al. | 370/331 |
| 2009/0316656 A1 | 12/2009 | Zhao et al. | |
| 2010/0099405 A1 | 4/2010 | Brisebois et al. | |
| 2010/0278150 A1* | 11/2010 | Park | H04W 36/0016 370/332 |

(Continued)

OTHER PUBLICATIONS

3GPP, "3rd Generation Partnership Project; Technical Specification Group Services and System Aspects: General Packet Radio Service (GPRS); Service description; Stage 2 (Release 10)", 3GPP TS 23.060 V10.0.0, Jun. 2010, 303 pages.

(Continued)

*Primary Examiner* — Wayne Cai
(74) *Attorney, Agent, or Firm* — Rothwell, Figg, Ernst & Manbeck, P.C.

(57) ABSTRACT

Some example embodiments presented herein may be directed towards a core network node, and corresponding method, for determining a modification and/or utilization of radio resources. The core network node may be in a Radio Network. Some example embodiments may comprise receiving, in the core network node, a notification for a radio resource modification and/or utilization for a User Equipment (UE) based on at least one handover criterion. Some example embodiments may further comprise establishing and/or modifying the radio resource based on the at least one handover criterion.

20 Claims, 3 Drawing Sheets

(56) References Cited

U.S. PATENT DOCUMENTS

| | | | | |
|---|---|---|---|---|
| 2010/0323696 A1* | 12/2010 | Cherian | ............. | H04W 60/005 |
| | | | | 455/435.2 |
| 2010/0331034 A1* | 12/2010 | Ishii | .................... | H04W 48/18 |
| | | | | 455/517 |
| 2011/0116461 A1* | 5/2011 | Holt et al. | ................... | 370/329 |
| 2011/0194535 A1* | 8/2011 | Johansson et al. | ........... | 370/331 |
| 2011/0237257 A1* | 9/2011 | Soliman et al. | ............. | 455/436 |
| 2011/0255516 A1* | 10/2011 | Pawar et al. | ................. | 370/332 |
| 2011/0269465 A1* | 11/2011 | Xu et al. | ....................... | 455/436 |
| 2011/0305137 A1* | 12/2011 | Chu et al. | .................... | 370/230 |
| 2012/0134275 A1* | 5/2012 | Choi et al. | .................... | 370/241 |

OTHER PUBLICATIONS

3GPP, "3rd Generation Partnership Project; Technical Specification Group Services and System Aspects: General Packet Radio Service (GPRS) enhancements for Evolved Universal Terrestrial Radio Access Network (E-UTRAN) access (Release 10)", 3GPP TS 23.401 V10.0.0, Jun. 2010, 261 pages.
Second Office Action issued in corresponding Chinese application serial No. 201180071659.0 dated Jan. 24, 2017, 12 pages.

\* cited by examiner

SGSN-MME CENTRIC HANDOVER

CROSS REFERENCE TO RELATED APPLICATION(S)

This application is a 35 U.S.C. §371 National Phase Entry Application from PCT/EP2011/060020 filed Jun. 16, 2011, the disclosure of which is incorporated by reference.

TECHNICAL FIELD

The example embodiments presented herein are directed towards a core network node, and corresponding system, for determining a modification and/or utilization of radio resources during a handover procedure.

BACKGROUND

In a typical cellular system, also referred to as a wireless communications network, wireless terminals, also known as mobile stations and/or User Equipments (UEs) communicate via a Radio Access Network (RAN) to one or more core networks. The wireless terminals can be mobile stations or user equipment units such as mobile telephones also known as "cellular" telephones, and laptops with wireless capability, e.g., mobile termination, and thus can be, for example, portable, pocket, hand-held, computer-comprised, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" or "B node" and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies. Long Term Evaluation (LTE) together with Evolved Packet Core (EPC) is the newest addition to the 3GPP family.

Mobility management is an important function in maintaining cellular networks. The goal of mobility management is to track where cellular phones, or User Equipments (UEs), are located in order for mobile phone services to be provided to the various UEs comprised in any given network. The network nodes which are primarily responsible for mobility management are the Mobility Management Entity (MME) and the Serving General Packet Radio Service (GPRS) Support Node (SGSN).

An important aspect of mobility management is handover. Handover is the process of transferring an ongoing call or data session from one channel connected to the core network to another. Handover is typically required when a mobile user is moving away from the area covered by one cell (e.g., a routing or tracking area) and entering the area covered by another cell.

SUMMARY

The process of handover is typically determined solely by UE movement and is controlled and initialized by a RAN node, such as the RNC or eNodeB. A need exists for handover solutions which provide service operators greater flexibility with regard to billing options associated with various services and service options. Thus, at least one object of some of the example embodiments presented herein is to provide flexible handover solutions in radio networks.

Some example embodiments are directed towards a method in a core network node for determining a modification and/or utilization of radio resource. The core network node may be comprised in a Radio Network. The method may comprise receiving, in the core network node, a notification for a radio resource modification and/or utilization for a User Equipment (UE) based on at least one handover criterion. The method may further comprise establishing and/or modifying the radio resource as a function of the at least one handover criterion.

Some example embodiments may further comprise the core network node being a Serving General Packet Radio Service Support Node (SGSN) or a Mobility Management Entity (MME) network node.

Some example embodiments may further comprise receiving the notification via a local configuration in the core network node, from a Policy and Charging Rules Function (PCRF) network node, or from a Service-Aware Policy Controller (SAPC) network node.

Some example embodiments may further comprise receiving the notification based on a time handover criterion. Some example embodiments may further comprise establishing and/or modifying the radio resource according to a predetermined radio resource scheme during a predetermined time frame.

Some example embodiments may further comprise receiving the notification based on a quality handover criterion. Some example embodiments may further comprise establishing and/or modifying the radio resource according to a Quality of Service (QoS) Class Identifier (QCI) value and/or traffic class.

Some example embodiments may further comprise receiving the notification based on a service handover criterion. Some example embodiments may further comprise establishing and/or modifying the radio resource according to a service subscription of the UE.

Some example embodiments may further comprise receiving the notification based on a location handover criterion. Some example embodiments may further comprise establishing and/or modifying the radio resource according to a current tracking area and/or routing area of the UE.

Some example embodiments may further comprise establishing and/or modifying a Radio Access Type (RAT) and/or a download rate.

Some example embodiments may be directed towards a core network node for determining a modification and/or utilization of radio resources. The core network node may be comprised in a Radio Network. The core network node may comprise a communications port that may be configured to receive a notification for a radio resource modification and/or utilization for a User Equipment (UE) based on at least one handover criterion. The core network node may also comprise a resource unit that may be configured to establish and/or modify the radio resource as a function of the at least one handover criterion.

Some example embodiments may further comprise the core network node being configured to perform any of the method steps described above.

Some example embodiments may be directed to a computer readable storage medium encoded with computer executable instructions, wherein the instructions, when executed by a core network node, may perform any of the method steps described above.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments.

Figure 1:
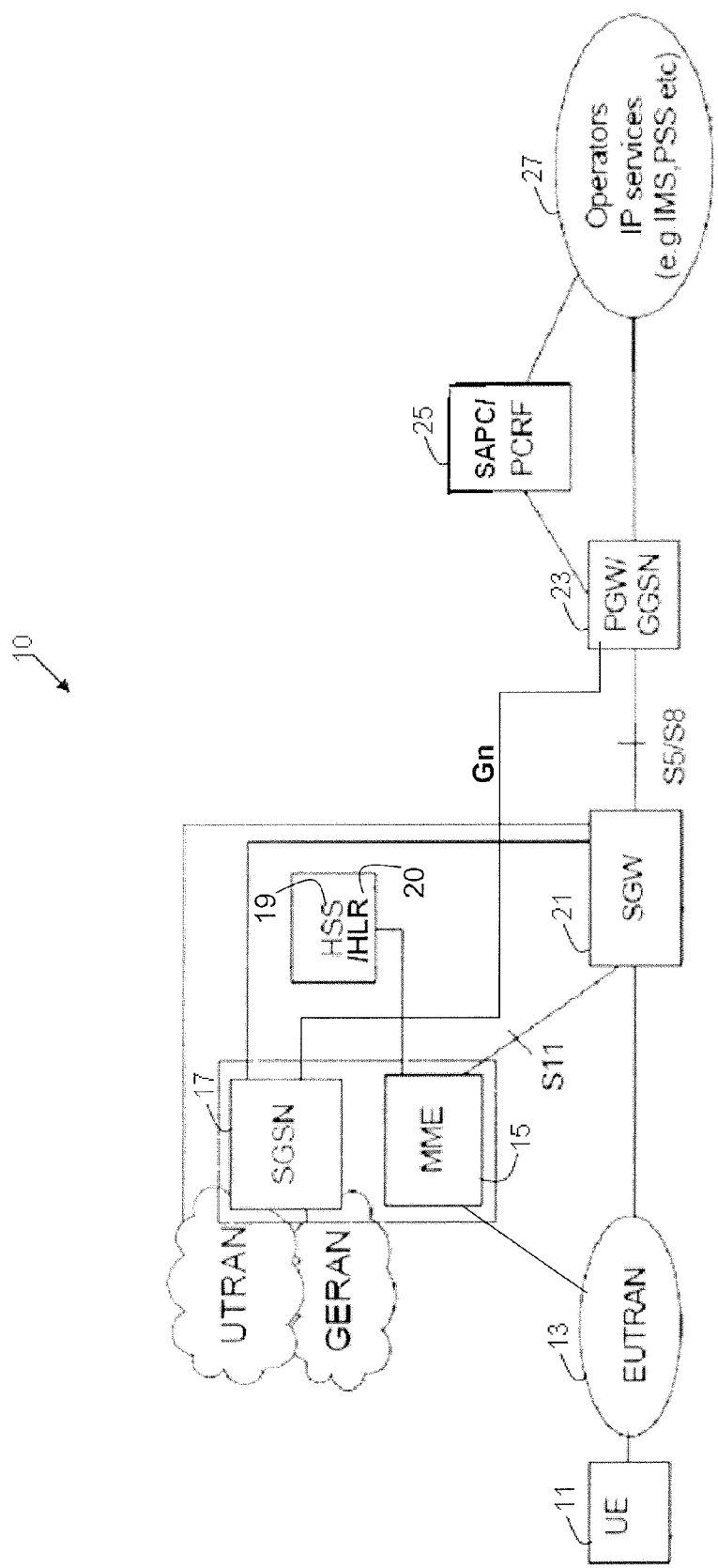
FIG. 1 is a schematic of a wireless network, according to some of the example embodiments.

FIG. 1 is a simplified illustration of an embodiment of a communication network 10. The communication network 10 is a telecommunication network using wireless and/or wired communication techniques. The communication network 10 may use technologies such as LTE, GPRS, etc. It should be noted that the communication links in the communication network 10 may be any communication link known in the art, for example, either a wired or wireless radio link. The link may use any suitable protocol depending on type and level of layer, e.g. as indicated by the Open System Interconnection (OSI) model, as understood by the person skilled in the art.

As shown in the communication network 10, a user equipment 11 may be connected to a radio access network, such as an E-UTRAN 13, i.e. the air interface of LTE. The E-UTRAN 13 may comprise base station(s) (not shown), eNodeB or any other network unit capable of communicating over a radio carrier with the user equipment 11.

The user equipment 11 may be any suitable communication device or computational device with communication capabilities capable to communicate with a base station over a radio channel, for example but not limited to, a mobile phone, smart phone, Personal Digital Assistant (PDA), laptop, MP3 player or portable Digital Video Disc (DVD) player, or similar media content devices, digital camera, or even stationary devices such as a Personal Computer (PC). A PC may also be connected via a mobile station as the end station of the broadcasted/multicasted media. The user equipment 11 may be referred to as UE in some of the drawings.

The communication network 10 comprises a mobility management unit, e.g. mobility management entity (MME) 15 and/or a Serving General Packet Radio Service Support Node (SGSN) 17. The MME 15 and SGSN 17 may be responsible for authenticating the user equipment 11 by interacting with a subscription unit, e.g. a Home Subscriber Server (HSS) 19 and/or Home Location Register (HLR) 20.

The MME 15 and SGSN 17 may be connected to a Serving Gateway (SGW) 21. S11 is the interface between the MME 15 and the SGW 21. S4 is the interface between the SGSN 17 and the SGW 21. The SGW 21 may act as a mobility anchor and route and forward user plane data between a Packet Data Network Gateway (PGW) 23 and the base station (not shown). The GGSN 23 may act as a mobility anchor and route and forward user plan data towards the base station (not shown), if the 3GDT is not in use then also the SGSN 17 is involved in the payload path. The SGW 21 may get instructions from the MME 15 and SGSN 17 to establish, modify and/or release Evolved Packet System (EPS) bearers.

The PGW/GGSN 23 is the interface between the internal Internet Protocol (IP) network of the operator and external networks 27, i.e. the PGW/GGSN 23 provides connectivity between the user equipment 11 and external PDN 27. A user equipment 11 may have simultaneous connectivity with more than one PGW/GGSN 23 for accessing multiple PDNs. The interface between the PGW/GGSN 23 and the SGW 21 is called S5/S8, the interface between the GGSN 23 and SGSN 17 is referred to as Gn.

The Policy and Charging Rules Function (PCRF)/Service-Aware Policy Controller (SAPC) 25 is connected between the PGW/GGSN 23 and an operator's IP services 27, such as e.g. IP Multimedia Subsystem (IMS), packet switch streaming (PSS) etc., and takes care of policy and charging issues between the user equipment 11 and the operator.

It should be appreciated that the network 10 is configured with cabling, routers, switches, and other network building elements (not shown) as understood by the skilled person, for instance as used for building an Ethernet or WAN network.

During a handover procedure, it is the RNC, BSC or eNodeB which controls and initiates the handover. Handover procedures are typically based solely on UE mobility. Such solutions limit service operators in terms of pricing schemes. Thus, some of the example embodiments presented herein provide handover solutions in which a core network node may control and initiate the handover by suggesting the RAN take action using existing signaling. Further, rather than UE mobility, some of the example embodiments presented herein provide handover solutions based, for example, on time, user subscription, location, and/or quality of service. The example embodiments presented herein provide service providers with more flexibility in offering service packagers to customers.

Figure 2:
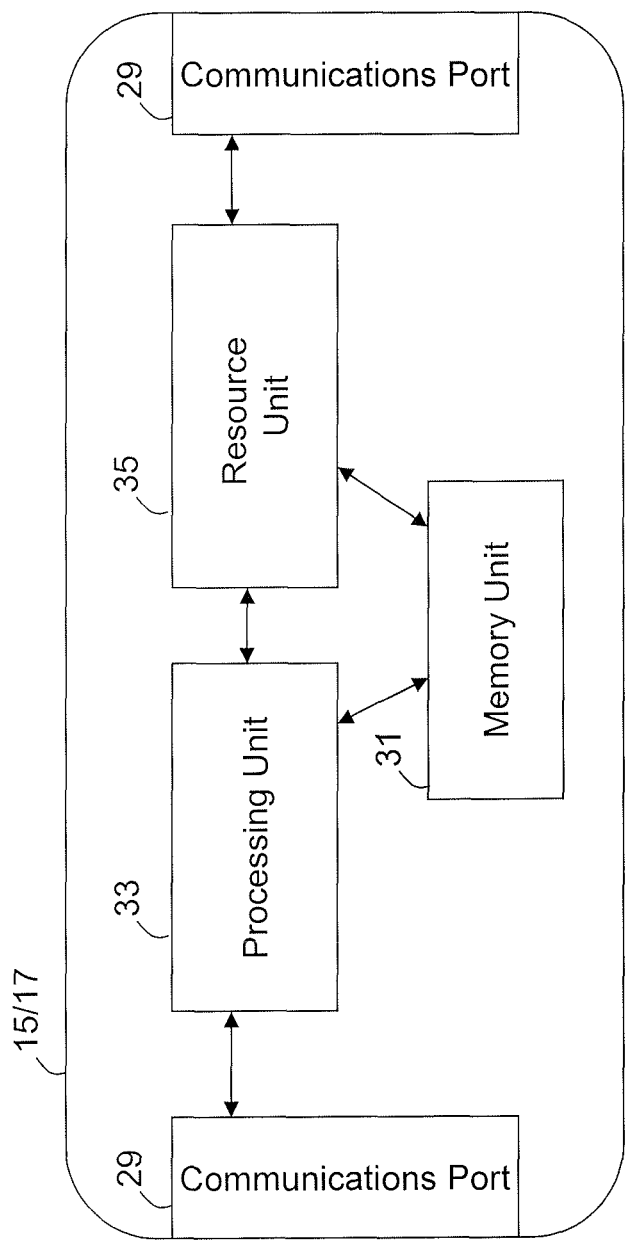
FIG. 2 is a schematic of a core network node, according to some of the example embodiments.
Figure 3:
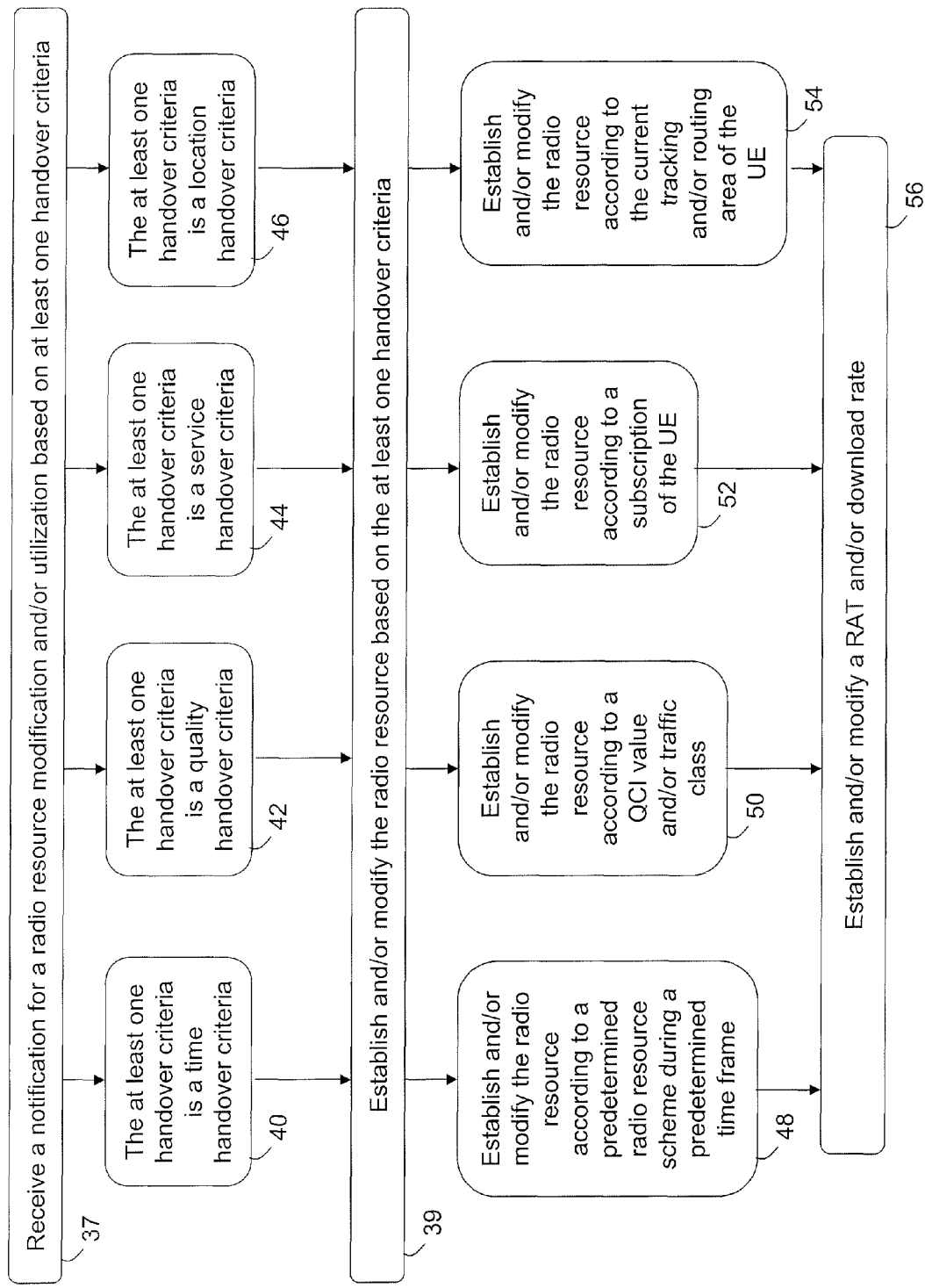
FIG. 3 is a flow diagram illustrating example operations which may be taken by the core network node of FIG. 2, according to some of the example embodiments.

FIG. 2 illustrates a core network node which may utilize some of the example embodiments presented herein. FIG. 3 illustrates example operations which may be taken by the core network node of FIG. 2, according to some of the example embodiments.

According to some of the example embodiments the network node may be the MME 15 and/or the SGSN 17. The network node 15/17 may comprise any number of communication ports 29 that may be able to transmit or receive any number or type of signals and/or data. It should be appreciated that the network node may alternatively comprise a single transceiver port. It should further be appreciated that the communication ports 29 or transceiver port may be in the form of any input/output communications port known in the art.

The network node 15/17 may also comprise at least one memory unit 31. The memory unit 31 may be configured to store received, transmitted, and/or measured data and/or executable program instructions. The memory unit 31 may be any suitable type of computer readable memory and may be of volatile and/or non-volatile type.

The network node 15/17 may further comprise a general processing unit 33. The network node 15/17 may also comprise a resource unit 35. The resource unit 35 may be configured to control and initiate a handover procedure. Specifically, the resource unit 35 may be able to establish and/or modify radio resources based on at least one handover criterion.

It should be appreciated that the general processing unit 33 and resource unit 35 need not be comprised as separate units. Furthermore the generally processing unit 33 and the resource unit 35 may be any suitable type of computation unit, e.g. a microprocessor, digital signal processor (DSP), field programmable gate array (FPGA), or application specific integrated circuit (ASIC).

During operation, the communications port 29 of the core network node 15/17 may be configured to receive a notification that a handover procedure may be needed for a radio resource modification and/or utilization (37). The notification may be received via a local configuration in the core network node. The notification may also be received from the Policy and Charging Rules Function (PCRF)/Service-Aware Policy Controller (SAPC) network node.

The notification that a handover procedure may be needed for a radio resource modification and/or utilization may be based on at least one handover criterion (40). The modification and/or utilization may comprise establishing or modifying a Radio Access Type (RAT) and/or a download/upload rate (56).

In some example embodiments, the at least one handover criterion may be a time handover criterion (40). Thus, the resource unit 35 and/or the general processing unit 33 may be configured to establish and/or modify the radio resource based on the time handover criterion (39). Specifically, the resource unit 35 and/or the general processing unit 33 may be configured to establish and/or modify the radio research according to a predetermined radio resource scheme during a predetermined time frame (48).

An example utilization of a handover procedure based on a time handover criterion may be a service provider establishing different service plans to be used during different time of the day. Such service plans and time of use specifications may be determined with consideration of traffic congestion during periods of peak payload data usage.

Thus, a handover procedure may be triggered based on a predetermined time of day. For example, during the hours of 5 pm to 11 pm, a service provider may offer a service plan featuring a download/upload rate of 8 Mbit utilizing a 3G/4G RAT. Once the time reaches 11:01 pm, a handover procedure may be initiated by the core network node 15/17 where the radio resources associated with a user will be modified to feature a download/upload rate of 2 Mbit utilizing a 2G RAT. This may also be initiated by the SAPC 25. It should be appreciated that the geographical areas may be supplied from the SAPC or the geographical areas may be locally configured.

Such service plans may be, for example, provided by an operator 27 and configured locally in the core network node 15/17. Thus, utilizing a handover based on a time handover criterion, a service provider may provide flat rate subscriptions based on time.

In some example embodiments, the at least one handover criterion may be a quality handover criterion (42). Thus, the resource unit 35 and/or the general processing unit 33 may be configured to establish and/or modify the radio resource based on the quality handover criterion (39). Specifically, the resource unit 35 and/or the general processing unit 33 may be configured to establish and/or modify the radio research according to a QoS Class Identifier (QCI) and/or a traffic class (50).

An example utilization of a handover procedure based on a QCI and/or traffic class handover criterion may be during attach or activation procedures, where a UE 11 may activate the PDP/Bearer with a specific QCI and/or traffic class value. For example, a UE may initiate the PDP/Bearer with a QCI value of 1 in a 2G RAT. Thereafter, the core network node (e.g., the SGSN 17 and/or the MME 15) may check the local policy and find a designated RAT type which may have been assigned to be used with specific QCI and/or traffic class value. The designation of the RAT type may be based on various service packages provided by the operator.

If the assigned RAT type is different from the RAT which the UE has utilized during activation, the core network node 15/17 may initiate a handover procedure. It should be appreciated that the download/upload rate allowed for the UE may also be changed based on the QCI and/or traffic class value. The PDP/Bearer with the highest QCI and/or traffic class for the UE may decide or dictate which RAT and/or download/upload rate should be utilized for the UE. Thus, utilizing a handover based on a QCI and/or traffic class value handover criterion, a service provider may provide flat rate subscriptions based on a quality of service.

In some example embodiments, the at least one handover criterion may be a service handover criterion (44). Thus, the resource unit 35 and/or the general processing unit 33 may be configured to establish and/or modify the radio resource based on the service handover criterion (39). Specifically, the resource unit 35 and/or the general processing unit 33 may be configured to establish and/or modify the radio resource according to a subscription of the UE (52).

An example utilization of a handover procedure based on a service handover criterion may occur when a current RAT and/or download/upload rate differs from a service based RAT and/or download/upload rate. For example, based on subscription plan, a specific UE may be configured to use a specific RAT and/or download/upload rate. Thus, during an attach or activation procedure, the network node 15/17 may interact with the GGSN, PGW, PCRF, and/or any other nodes in the network which may comprise subscription based information in order to confirm the RAT and/or download/upload rate being currently utilized is in accordance with the UEs service subscription.

If RAT and/or download/upload rate differs from a subscribed RAT and/or download/upload rate, a trigger may be sent to the core network node 15/17. The trigger may be sent by any of the GGSN, PGW, PCRF, and/or any other nodes in the network which may comprise subscription based information. Once the core network node receives a subscription based trigger, a handover procedure may be initiated by the core network node 15/17 in order to provide the UE with the subscribed RAT and/or download/upload rate. It should be appreciated that the core network node 15/17 may receive the service based handover criterion or triggers through any communications message utilized in the art. For example, communications messages utilized during an attach or activation procedure. Thus, utilizing a handover based on a service handover criterion, a service provider may provide flat rate subscriptions based on a subscription service plan.

In some example embodiments, the at least one handover criterion may be a location handover criterion (46). Thus, the resource unit 35 and/or the general processing unit 33 may be configured to establish and/or modify the radio resource based on the location handover criterion (39). Specifically, the resource unit 35 and/or the general processing unit 33 may be configured to establish and/or modify the radio research according to the current tracking and/or routing area of the UE (54).

With the use of location handover criterion, an operator may be able to specify radio resource configurations based on the location of the UE 11. Specifically, the operator may be able to designate a specific RAT and/or download/upload rate for a particular UE. For example, if UE 11 is attached in a 3G RAT (e.g., RA1) and the UE thereafter moves to another RAT (e.g., RA2), the core network node (e.g., SGSN 17 and/or MME 15) may check the local policy associated with the UE and find that the desired RAT type for RA2 is 2G. Thus, the core network node may initiate a handover procedure so that the UE may utilize the 2G network. It should also be appreciated that changes in download/upload rates may be applied in a similar fashion. It should be appreciated that the geographical areas may be supplied from the SAPC or the geographical areas may be locally configured.

It should be appreciated that the scenarios presented above were merely examples. The example embodiments need not feature a modification of the download/upload rate and the RAT; the modification may be with respect to the download/upload rate or the RAT. Furthermore, it should be appreciated that modification need not occur during an attach or activation procedure. In some example embodiments, a handover procedure may be controlled and/or initiated by the core network node 15/17 after a PDN connection has already been established. It should also be appreciated that the examples provided above may be used in conjunction with one another.

The above mentioned and described embodiments are only given as examples and should not be limiting to the present invention. Other solutions, uses, objectives, and functions within the scope of the invention as claimed in the below described patent claims should be apparent for the person skilled in the art.

Modifications and other embodiments of the disclosed invention(s) will come to mind to one skilled in the art having the benefit of the teachings present in the foregoing descriptions and the associated drawings. Therefore, it is to be understood that the invention(s) is/are not to be limited to the specific embodiments disclosed and that modifications and other embodiments are intended to be comprised within the scope of this disclosure. Although specific terms may be employed herein, they are used in a generic and descriptive sense only and not for purpose of limitation.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be implemented at least in part by means of both hardware and software, and that several "means", "units" or "devices" may be represented by the same item of hardware.

A "device" as the term is used herein, is to be broadly interpreted to comprise a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) terminal that may combine a cellular radiotelephone with data processing; a personal digital assistant (PDA) that can comprise a radiotelephone or wireless communication system; a laptop; a camera (e.g., video and/or still image camera) having communication ability; and any other computation or communication device capable of transceiving, such as a personal computer, a home entertainment system, a television, smart phone, touch phone, tablet computer, etc.

The various embodiments of the present invention described herein is described in the general context of method steps or processes, which may be implemented in one embodiment by a computer program product, embodied in a computer-readable medium, including computer-executable instructions, such as program code, executed by computers in networked environments. A computer-readable medium may comprise removable and non-removable storage devices including, but not limited to, Read Only Memory (ROM), Random Access Memory (RAM), compact discs (CDs), digital versatile discs (DVD), flash memory, EEPROM, etc. Generally, program modules may comprise routines, programs, objects, components, data structures, etc. that perform particular tasks or implement particular abstract data types. Computer-executable instructions, associated data structures, and program modules represent examples of program code for executing steps of the methods disclosed herein. Such instructions may be executed by the processing unit, e.g., central processing unit, microcontroller, microprocessor, field programmable gate array, application specific integrated circuit, digital signal processor, etc. The particular sequence of such executable instructions or associated data structures represents examples of corresponding acts for implementing the functions described in such steps or processes.

The invention claimed is:

1. A method for determining a modification of radio resources, the method comprising:
   determining that a handover criterion is met for a User Equipment (UE) that is currently utilizing a first radio access technology (RAT), wherein determining that the handover criterion is met for the UE comprises:
   i) determining a RAT assigned to the UE; and
   ii) determining, by the core network node, that the first RAT is different than the RAT assigned to the UE; and
   as a result of determining that the first RAT is different than the RAT assigned to the UE, triggering a handover procedure for handing the UE over from the first RAT to a second RAT.

2. The method of claim 1, wherein the method is performed by the core network node and the core network node is one of: a Serving General Packet Radio Service Support Node (SGSN), a Mobility Management Entity (MME) network node, a Service-Aware Policy Controller (SAPC) and a Policy and Charging Rules Function (PCRF).

3. The method of claim 1, wherein determining that the handover criterion is met for the UE further comprises determining a rate at which data is transmitted to or from the UE and determining that the determined rate differs from a subscribed rate for the UE.

4. The method of claim 3, further comprising triggering the handover procedure in response to determining that the determined rate differs from a subscribed rate for the UE and that the first RAT is different than the RAT assigned to the UE.

5. The method of claim 1, further comprising transmitting the notification to a mobility management node.

6. The method of claim 5, wherein the method is performed by one of: a Service-Aware Policy Controller (SAPC) and a Policy and Charging Rules Function (PCRF).

7. The method of claim 1, wherein the first RAT is one of a 3G RAT and a 4G RAT, and the second RAT is a 2G RAT.

8. The method of claim 1, wherein triggering the handover procedure comprises transmitting a handover required message.

9. The method of claim 1, wherein determining the RAT assigned to the UE comprises
obtaining, during an Attach Procedure initiated by the UE, subscription information associated with the UE; and
determining, based on the subscription information, the RAT assigned to the UE.

10. The method of claim 9, wherein the first RAT is designated to be used with a first quality of service class identifier (QCI) or traffic class value and the RAT assigned to the UE is designated to be used with a second QCI or traffic class value.

11. The method of claim 9, wherein the first RAT is designated to be used during a first predetermined time of day and the RAT assigned to the UE is designated to be used during a second predetermined time of day.

12. A core network node for determining a modification of radio resources, the core network node comprising:
a communications port; and
a processor coupled to the communications ports, the processor being configured to determining whether a handover criterion is met for a User Equipment (UE) that is currently utilizing a first radio access technology (RAT), wherein
determining whether the handover criterion is met for the UE comprises:
determining, by the core network node, a RAT assigned to the UE,
determining, by the core network node, that the first RAT is different than the RAT assigned to the UE, and
as a result of determining that the first RAT is different than the RAT assigned to the UE, triggering a handover procedure for handing the UE over from the first RAT to a second RAT.

13. The core network node of claim 12, wherein the core network node is a Serving General Packet Radio Service Support Node (SGSN) or a Mobility Management Entity (MME) network node.

14. The core network node of claim 12, wherein the core network node comprises one or more of: a Service-Aware Policy Controller (SAPC) and a Policy and Charging Rules Function (PCRF).

15. The core network node of claim 12, wherein determining whether the handover criterion is met for the UE comprises determining a rate at which data is transmitted to or from the UE and determining that the determined rate differs from a subscribed rate for the UE.

16. A computer program product comprising a non-transitory computer readable storage medium encoded with computer executable instructions, wherein the instructions, when executed by a core network node, enable the core network node to perform the method of claim 1.

17. A method for determining a modification of radio resources, the method comprising:
during an Attach Procedure initiated by a User Equipment (UE) for attaching to a first radio access technology (RAT): obtaining subscription information associated with the UE and determining, based on the subscription information, a RAT to which the UE is subscribed;
determining that a handover criterion is met for the UE, wherein determining that the handover criterion is met for the UE comprises determining, by a core network node, that the first RAT is different than the RAT to which the UE is subscribed;
generating a notification for a radio resource modification for the UE in response to determining that the handover criterion is met; and triggering a handover procedure for handing the UE over from the first RAT to a second RAT as a result of the handover criterion being met.

18. The method of claim 17, wherein the first RAT is not in accordance with the subscription information and the second RAT is in accordance with the subscription information.

19. The method of claim 17, wherein the first RAT is designated to be used with a first quality of service class identifier (QCI) or traffic class value and the second RAT is designated to be used with a second QCI or traffic class value.

20. The method of claim 17, wherein the first RAT is designated to be used during a first predetermined time of day and the second RAT is designated to be used during a second predetermined time of day.

* * * * *